United States Patent [19]

Futamura

[11] Patent Number: 5,129,554
[45] Date of Patent: Jul. 14, 1992

[54] CATCH-IN PREVENTION ROTARY VALVE

[75] Inventor: Mitsushi Futamura, Osaka, Japan

[73] Assignee: Nippon Aluminium Mfg. Co. Ltd., Osaka, Japan

[21] Appl. No.: 683,925

[22] Filed: Apr. 11, 1991

[30] Foreign Application Priority Data

Apr. 26, 1990 [JP] Japan ............................ 2-44992[U]

[51] Int. Cl.$^5$ ............................................. G01F 11/10
[52] U.S. Cl. ..................................... 222/368; 222/564; 222/342
[58] Field of Search ............... 222/342, 345, 347, 355, 222/344, 349, 367, 368, 564; 414/219, 220, 301

[56] References Cited

U.S. PATENT DOCUMENTS

| | | | |
|---|---|---|---|
| 1,493,005 | 5/1924 | Snow | 222/368 X |
| 1,869,120 | 7/1932 | Thoeming et al. | 222/368 X |
| 3,052,383 | 9/1962 | Transeau | 222/368 X |
| 3,118,575 | 1/1964 | McCauley | 222/368 X |
| 3,138,296 | 6/1964 | Neidhardt | 222/564 X |
| 3,659,754 | 5/1972 | Barone et al. | 222/368 |
| 4,173,298 | 11/1979 | Lease | 222/368 |
| 4,537,333 | 8/1985 | Bjerregaard | 222/368 X |
| 4,721,231 | 1/1988 | Richter | 222/564 X |
| 4,823,993 | 4/1989 | Siegal et al. | 222/368 X |
| 4,986,455 | 1/1991 | Rambold | 222/564 X |

FOREIGN PATENT DOCUMENTS 23119 1/1990 Japan ................................. 222/368
133464 10/1951 U.S.S.R. ........................... 222/368

Primary Examiner—Kevin P. Shaver
Assistant Examiner—Kenneth DeRosa
Attorney, Agent, or Firm—Armstrong & Kubovcik

[57] ABSTRACT

A catch-in prevention rotary valve includes a rotor case having an inlet port and an outlet port and a rotor having a plurality of blades. The rotor is supported in the rotor case such that it can be rotatably driven about a horizontal shaft. Each of the blades has a blade end, and each blade end as viewed in elevation has a V-shape which is open to a front side in a predetermined rotation direction of each blade. A member is disposed above the inlet port having a shielding part and two inclining walls which have respective scratcxh-off edges, the two inclining walls opening into a V-shape toward a rear side in the predetermined rotation direction of each the blade, and the shielding part having a V-shape including a rear trip end. The rear tip end of the shielding part protrudes between the two inclining walls toward the rear side from a front central part of the two inclining walls. A bottom surface of the shielding part has a concave portion having a depth through which plural granules can pass. A plurality of air-vent grooves extend in a bottom surface of the member below respective ones of the inclining walls, each of which extend from a front side to a rear side of the member as viewed in the rotation direction.

3 Claims, 4 Drawing Sheets forward (R)

1

CATCH-IN PREVENTION ROTARY VALVE

BACKGROUND OF THE INVENTION

Industrial useful field

This invention relates to a catch-in prevention mechanism for a rotary valve which carries out a constant volume discharge of granules such as plastic pellets etc.

In a principal structure of such a rotary valve, a rotor 3 having plural blades 4 rotates in a rotor case 5 in a direction R so as to discharge pellet etc., which is thrown in from an upper side granule throw-in port 1, to a lower side discharge port 6 as illustrated by FIG. 7.

A problem by which the rotary valve is confronted, is how to prevent a phenomenon that granules are caught in between an outer peripheral edge of the blade 4 and an inside wall of the rotor case 5 so as to be deformed and collapsed in the vicinity of a front edge B in rotor rotation direction of the granule throw-in port 1, i.e. how to prevent a granule catch-in phenomenon.

As a device for preventing the granule catch-in phenomenon a device shown in FIG. 8 Japanese Published Utility Model Application ,Jikkaisyo 60-137945) or a device shown in FIG.9 Japanese Published Patent Application , Tokkaisyo 61-145039) has been developed.

In the device of FIG. 8, a shielding part 7 is provided at a central portion in a widthwise direction of the throw-in port 1, and a scratch-off edge 9 of an inclining wall 8 and an auxiliary throw-in groove 10 are formed into a backward-facing V-shape. That is, a central hollow portion (S of FIG. 5) is formed on a pellet in a rotor pocket by controlling a central portion of opening part by the shielding portion 7, so that the caught-in phenomenon is prevented. Further, a charging efficiency is also improved by supplementing the pallet to the central hollow portion of pellet with the auxiliary throw-in groove 10.

The device of FIG. 9 has an approximately similar structure to that of FIG. 8, in principle. In this device, the shielding part 7 is provided at the central portion in the widthwise direction of the throw-in port 1, and the auxiliary throw-in groove 10 is formed into the backward-facing V-shape.

In the above-mentioned structures, however, the following disadvantages arise. The shielding part 7 provided at the central portion in the widthwise direction of the throw-in port 1 connects up to a rear edge 1a of the throw-in port 1 to completely separate the opening part to both left and right sides, so that long tape-form froths produced in a pneumatic transportation pipe are caught at the shielding part 7.

Further, since the auxiliary throw-in groove 10 is formed into the V-shape opening to the rear side of the rotation direction, leaking air is concentrated at a front end F of the V-shaped auxiliary throw-in groove 10 and the leaking air is blown up from this place, when a pressure caused by a pneumatic transportation, etc., is applied on a lower part of the rotary valve. The pellet is stirred up by the blowing-up air at the F portion, so that the catch-in trouble prevention function does not work completely.

In FIG. 8 and FIG. 9, the catch-in state between the scratch-off edge 9 and the blade 4 might occur because of a small angle made by the scratch-off edge 9 and the blade 4.

SUMMARY OF THE INVENTION

An object of this invention is to provide a catch-in prevention mechanism for preventing catch-in of granules by installing a V-shape scratch-off edge and a central shielding part on a throw-in port; characterized in that a caught-in tape-form froth etc. is remedies and local blowing up of leaking air from a discharge port side is prevented so that the catch-in prevention function can be further enhanced.

An object of this invention as set forth in claim 2 is to prevent a catch-in phenomenon from arising between a blade and a scratch-off edge.

In order to accomplish the above object, a rotor having plural blades is supported in a rotor case in such a manner as to be rotatably driven around a horizontal shaft, a blade is formed to have a V-shape or a curved shape opening to a front side in the rotation direction of the blade, inclining walls which have scratch-off edges opening into a V-shape toward a rear side as viewed from above and a shielding part which protrudes into a reverse-V-shape toward the rear side from a front central part of the inclining wall, are installed on a granule throw-in port provided on an upper part of the rotor case, a rear tip end of the shielding part is spaced from a rear edge of the throw-in port with a clearance left between them, a concave portion having a depth through which plural granules can pass is formed on a bottom surface of the shielding part, and air-vent grooves, which extend from a front side of rotation direction to a rear side of rotation direction relatively to the blade at time of passing the front end of the scratch-off edge, are formed on bottom surfaces of the inclining walls.

Further, a rotor having plural blades is supported in a rotor case in such a manner as to be rotatably driven around a horizontal shaft, a blade is formed to have a V-shape or a curved shape opening to a front side in the rotation direction of the blade, inclining walls which have scratch-off edges opening into a V-shape toward a rear side as viewed from above are installed on a granule throw-in port provided on an upper part of the rotor case, and an angle made by the rotor blade and the scratch-off edge is so preset as to be over 45° inclusive.

The tip end of the shielding part is spaced from the rear edge of the throw-in port by a distance, so that there is no chance for a long froth to be caught in and accumulated around the shielding part even if the long froth is mingled in the thrown-in pellet.

A small space (non-charged section) is formed at the central portion of widthwise direction of rotor in the pellet supplied to the pocket between the blades, by means of an action of the shielding part. The pellet scratched off by the scratch-off edge is gathered to the central side as the blades move, and is positively put in the space of the pocket. An angle made by the blade and the scratch-off edge is taken large such as above 45° inclusive, so that there is no chance for the pellet to be caught at the scratch-off edge A concave portion having a size corresponding to two or three pellets is formed on the bottom surface of the shielding part, so that the catch-in phenomenon does not arise at the edge of the shielding part.

When a pressure at a discharge side is kept high due to a high-pressure gas type pneumatic transportation system, the leaking air passes from the air-vent grooves through the concave portion to the throw-in port. Accordingly, the leaking air does not concentrate at and blow up from the front edge of the scratch-off edge.

DETAILED DESCRIPTION OF THE INVENTION

Figure 4:
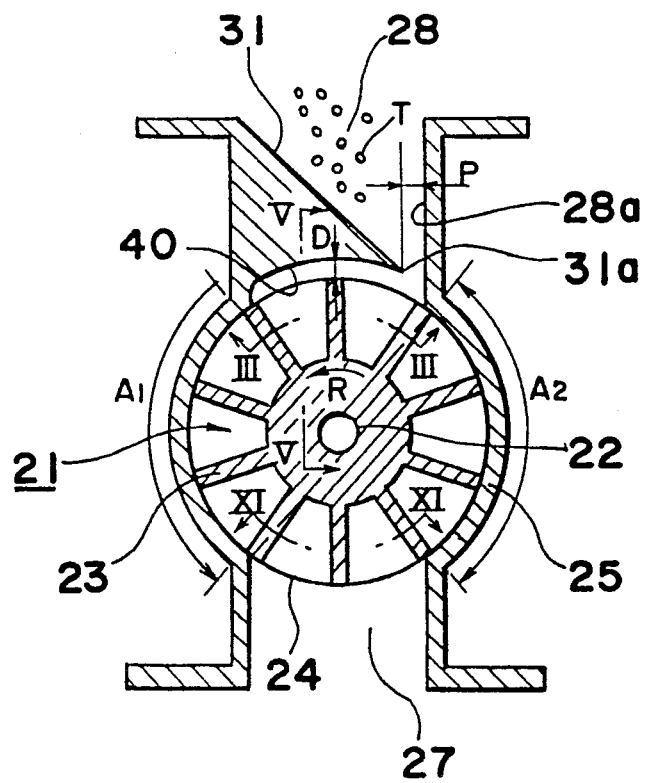
FIG. 4 is a sectional view taken on a line IV—IV of FIG. 1.
Figure 11:
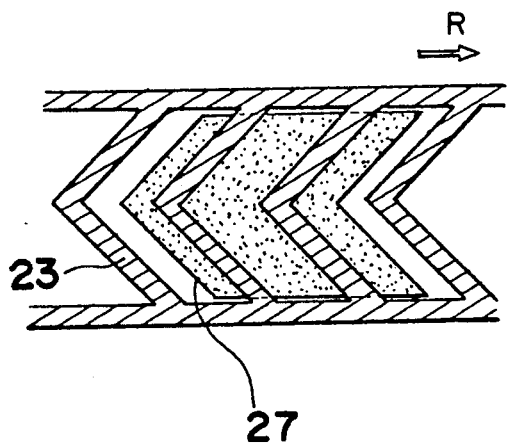
FIG. 11 is a bottom view (sectional view taken on a line XI—XI) of a discharge port portion of FIG. 4.

In FIG. 4 showing the entire vertical sectional view of the rotary valve to which this invention is applied, a rotor 21 is composed of a horizontal rotor shaft 22, plural blades 23 and a pair of left and right end plate 24 etc. The rotor shaft 22 is rotatably supported by a cylindrical rotary case 25 and is rotated by an appropriate drive mechanism at a specified speed in a direction R. The blades 23 are radially installed at plural places on an outer periphery of the rotor shaft 22 with equal spaces left between them in a circumferential direction, and plural granule containing pockets having constant volumes are formed by the blades 23 and the end plates 24 respectively. A discharge port 27 is provided on the bottom end of the rotor case 25, and the discharge port 27 is connected, for example, to a high-pressure type pneumatic transportation system so as to be exposed to a high pressure (0.5 to 3 kg/cm² G). A shape of the discharge port 27 is formed into one in which its front and rear end portions of rotation direction are formed into a shape adapted to a shape of the blade 23, i.e. a V-shape for example, as illustrated by FIG. 11 (sectional view taken on the line XI—XI).

Figure 1:
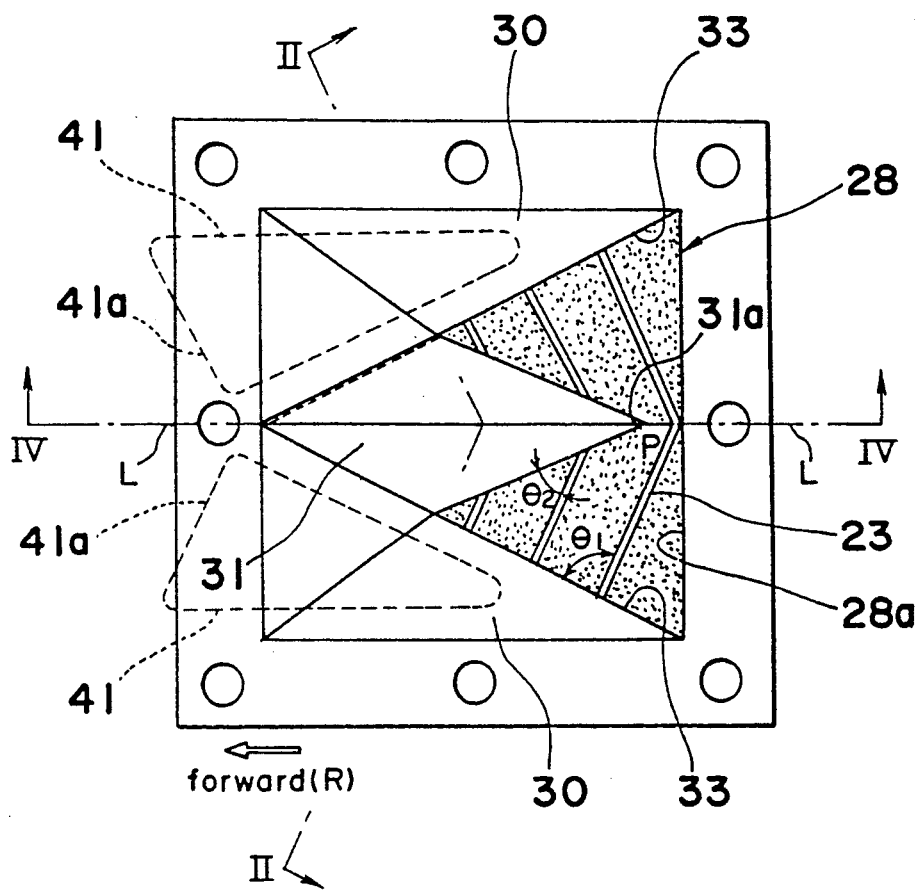
FIG. 1 is a plan view of a rotary valve to which this invention is applied.

A throw-in port 28 is provided on an upper part of the rotary case 25 of FIG. 4. In FIG. 1 showing the plan view, the throw-in or inlet port 28 is formed into a rectangular shape as viewed from an upper side, and a pair of inclining walls 30 which are symmetric in relation to a central plane L dividing a rotor lateral width into two equal parts and a shielding part 31 which extends to a rear side of rotor rotation direction along the central plane L, are formed. The inclining walls 30 are so slanted that they go down as they get near to the above-mentioned central plane L side, and lower end scratch-off edges 33 are formed into a V-shape opening toward the rear side of rotation direction. The shielding parts 31 protrude rearward from a front end of the inclining wall 30 into an inverse-V-shape as viewed from the upper side, and its rear tip end 31a is spaced from a rear edge 28a of the throw-in port 28 by a distance P.

The blades 23 are formed into a V-shape opening widely to the front side of rotation direction, and an angle $\theta 1$ made by the blade 23 and a scratch-off edge 33 is equal to or more than 45° and is ordinarily preset to about 60° to 90°. It is desirable to preset this angle to $\theta 1 = 80°$ to 90° in order to positively remedy the catch-in trouble of a soft pellet.

Figure 2:
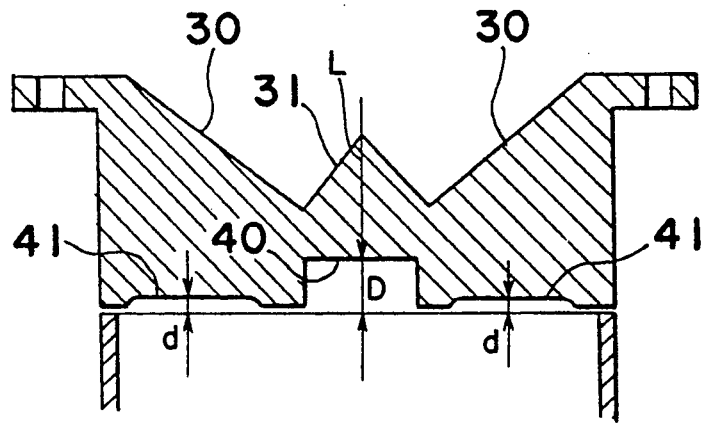
FIG. 2 is a sectional view taken on a line II—II of FIG. 1.

In FIG. 2 showing the section taken on the line II—II of FIG. 1, the shielding part 31 is formed into a shape having a reverse-V-shape section having its top on the above-mentioned central plane L, and a concave portion 40 having a depth D in which about two or three particles of pellet can be put is formed on a bottom surface of the shielding part 31. Air vent grooves 41 having a depth of about 1 to 2 mm are formed on bottom surfaces of respective inclining walls 30. That is, the air vent grooves 41 are formed at two, left and right, places.

Figure 3:
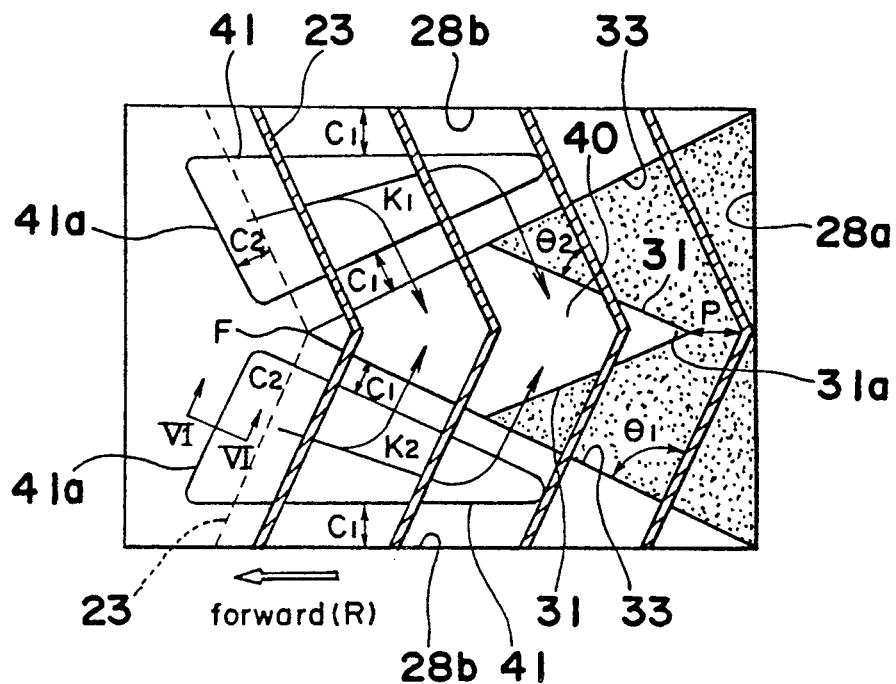
FIG. 3 is a rear view (sectional view taken on a line III—III of FIG. 4) of a throw-in port portion of FIG. 1.
Figure 6:
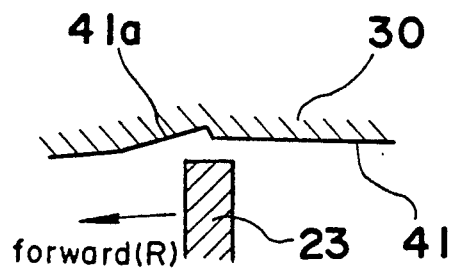
FIG. 6 is an enlarged sectional view taken on a line VI—VI of FIG. 3.
Figure 7:
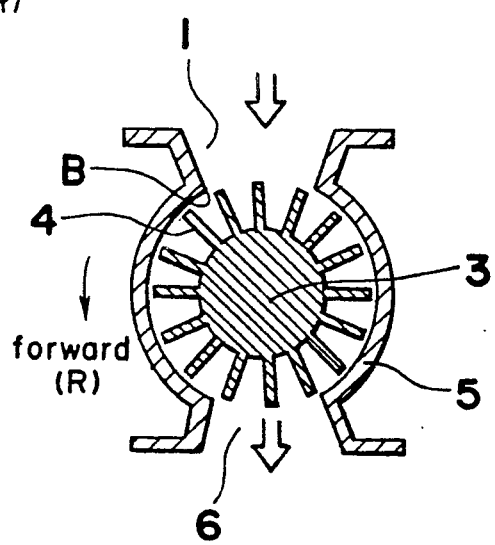
FIG. 7 is a vertical sectional view showing a principal structure of a prior art general rotary valve.

FIG. 3 shows the rear view (sectional view taken on the line III—III of FIG. 4) of the throw-in port portion, and each air vent groove 41 is formed into a triangular shape so as to be spaced from a throw-in port side edge 28b and the scratch-off edge 33 by a specified distance C1. A front edge 41a of each air vent groove 41 is formed in parallel with the blade 23, and located at a position deviated to the front side of rotation direction by a specified distance C2 in relation to the blade 23 (shown by a broken line) when it passes the front end F of the scratch-off edge 33. The air vent groove goes beyond the blade 23 shown by the above-mentioned broken line and extends to the rear side of rotation direction into the triangular shape. Further, a sectional shape of the front edge 41a of the air vent groove 41 is not stepped but made into a smooth sloped surface as illustrated by FIG. 6.

Incidentally, an upper surface of the shielding part 31 is so slanted that it goes down as it gets to a rear side of rotation direction R, as illustrated by FIG. 4.

Function of the apparatus will be described hereunder. The rotor 21 rotates at a constant speed in the direction R of FIG. 4 and the pellet T (granule) is supplied from a hopper etc. to the throw-in port 28. Material which is nearly similar to a spherical body having a diameter of about 4 mm or that of a cylindrical flat body having a diameter of about 4 mm and a length of 2 to 3 mm, is used for the pellet T. The tip end 31a of the shielding part 31 is spaced from the rear edge 28a of the throw-in port 28 by a distance P, so that there is no chance for a long froth to be caught in and accumulated around the shielding part 31 even if the long froth is mingled in the thrown-in pellet.

Figure 5:
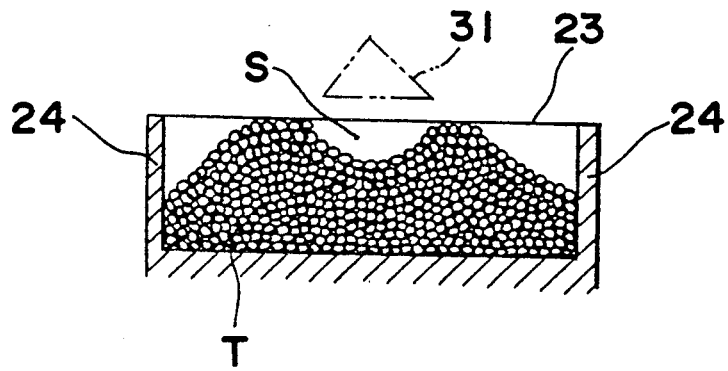
FIG. 5 is a sectional view of a rotor taken on a line V—V of FIG. 4.

The pellet T slides on the inclining wall 30 of FIG. 1 to be supplied from a W-shaped opening of the throw-in port 28 to a pocket between the blades 23, and a small space (non-charged section) S corresponding to an angle of repose is formed at the central portion of widthwise direction of rotor by a action of the central shielding part 31 as illustrated by FIG. 5.

The angle $\theta 1$ between the scratch-off edge 33 and the blade 23 is made large as shown in FIG. 1, so that there is no chance for the pellet to be caught in a part of the scratch-off edge 33 and the pellet is gathered to the central side as the blades 23 move. The pellet enters the bottom concave portion 40 of the shielding part 31 of FIG. 3 and is securely filled in the space S of pocket inside of FIG. 5 in the vicinity of the front end F of the scratch-off edge.

An angle $\theta2$ made by the shielding part 31 and the blade 23 becomes small by taking the $\theta1$ large, however, the caught-in trouble at the edge of the shielding part 31 does not occur because the concave portion 40 having a size corresponding to two or three pellets is formed on the bottom surface of the shielding part 31.

The pellets charged in the pocket are moved downward to be discharged from the bottom discharge port 27 of FIG. 4 into the pneumatic transportation system.

During rotation of the rotor, a high pressure is applied to the discharge port 27 side by the high-pressure gas type pneumatic transportation system so that air leakage to the throw-in port side arises. The leaking air flows into the air vent groove 41 at a front side of the scratch-off edge front end F as shown in FIG. 3, and then to the throw-in port 28 side through the air vent groove 41 and the concave portion 40 as shown by arrows K1 and K2. Therefore, there is no chance for air to gather around and blow up from the scratch-off edge front end F, so that the pellet is not disturbed around the front end F and can be prevented from being caught in this portion.

Figure 10:
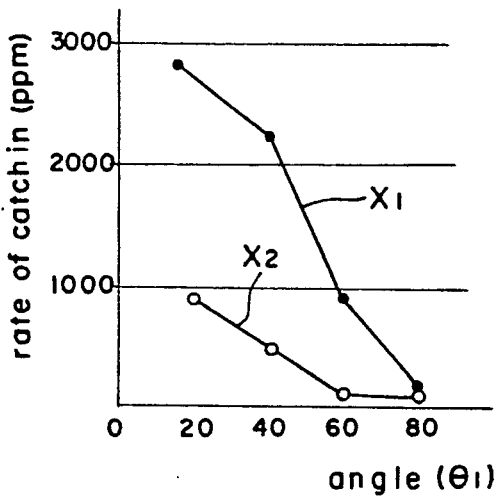
FIG. 10 is a graph showing a rate of catch-in in relation to an angle made by the blade and the scratch-off edge.

FIG. 10 shows the relation between the angle $\theta 1$ made by the blade 23 and the scratch-off edge 33 and the rate of catch-in, and X1 represents a case where a soft pellet such as EVA etc. is used and X2 represents a case where hard pellet such as HDPE etc. is used. In case of the hard pellet X2, the rate of catch-in can be decreased by a large margin by presetting the angle $\theta 1$ to over 45° inclusive and preferably to over 60° inclusive. And in case of the soft pellet X1, the rate of catch-in can be decreased by a large margin by presetting the angle $\theta1$ at least to a range of 80° and over to 90° inclusive.

Other embodiments (1) The blade 23 may be formed into a curved shape opening to the front side of rotation direction.

(2) Sealing function can be improved by forming the shape of the front edge 41a of the air vent groove 41 into a shape corresponding to the blade 23 as shown by FIG. 3, but this shape is not limited only to the shape parallel to the blade. Further, it is possible to combine the both air grooves into one groove in which the front ends of the left and right air vent grooves 41 are joined together.

According to the invention, as the following advantages become obtainable.

(1) The clearance P is provided between the rear tip end 31a of the shielding part 31 and the rear edge 28a of the throw-in port 28, so that there is no chance for the long froth to be caught in and accumulated around the shielding part 31 even if the long froth is mingled in the thrown-in pellet.

(2) The concave portion 40 having a depth through which plural granules can pass is formed on the bottom surface of the shielding part 31, so that there is no chance for the pellet to be caught in the edge of the shielding part 31.

Figure 9:
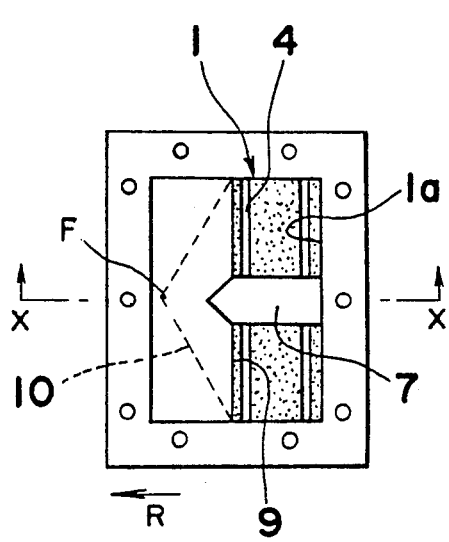
FIG. 8 and FIG. 9 are plan views of conventional rotary valves equipped with catch-in prevention devices respectively.
Figure 8:
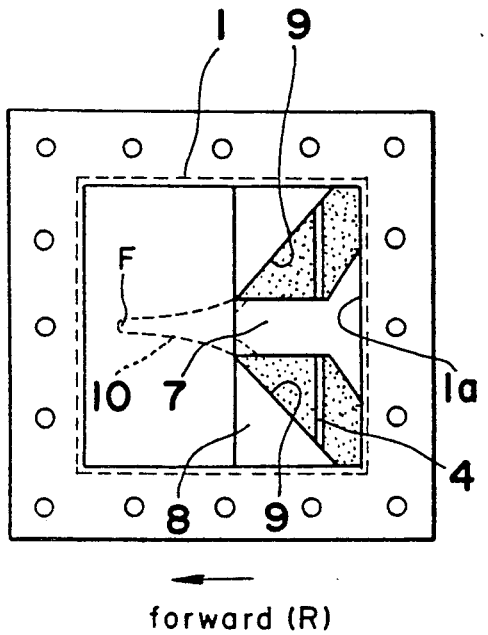

(3) The air vent grooves 41 extending to the front side from the front edge F of the scratching edge 33 are formed on the bottom surface of the inclining walls 30, so that the leaking air passes from the air vent grooves 41 to the throw-in port side before it gathers at the scratch-off edge front end F, in the event when the discharge port side is exposed to a high pressure due to the high-pressure gas type pneumatic transportation system so as to produce the air leakage to the throw-in port side. Consequently, there is no chance for the leaking air to accumulate on and blow up from the scratch-off edge front end F as in case of prior arts shown by FIG. 8 and FIG. 9 so that the catch-in trouble at the front end F can be remedied securely.

According to the invention,; the scratch-off edges 33 are formed into the V-shape opening to the rear side of rotor rotation direction, the blades 23 are formed into the V-shape or curved-shape opening to the front side of rotor rotation direction, and the angle $\theta1$ made by the blade 23 and the scratch-off edge 33 is taken large such as over 45° inclusive. Therefore, the pellets scratched by the scratch-off edge 33 are smoothly slidden and gathered to the central part so that the catch-in trouble at the part of the scratch-off edge 33 does not occur.

When the shape of the rear end of rotation direction of the discharge port 27 is formed into one adapted to the shape of the rotor blade 23 i.e. the V-shape (or curved shape) as shown by FIG. 11, the problem of decrease in the width of air sealing (lengths of A1 and A2 of FIG. 4) as encountered when the blade is formed into the V-shape (or curved shape), can be solved and the the sealing performance can be maintained in good state.

What is claimed is:

1. A catch-in prevention rotary valve, comprising: a rotor having plural blades supported in a rotor case so as to be rotatably driven around a horizontal shaft, each of said plural blades having a shape which is a V-shape opening to a front side in a rotation direction of the blades, and a member having inclining walls which have scratch-off edges opening into a V-shape toward a rear side as viewed from an upper side, said inclining walls of said member being installed on a granule throw-in port provided on an upper part of said rotor case, wherein an angle made by the rotor blade and each of the scratch-off edges is present to be at least 45 degrees.

2. A catch-in prevention rotary valve, comprising:
a rotor case having an inlet port and an outlet port;
a rotor having a plurality of blades, said rotor being supported in said rotor case such that it can be rotatably driven about a horizontal shaft;
each of said plurality of blades having a blade end, each blade end as viewed in elevation having a V-shape which is open to a front side in a predetermined rotation direction of each said blade;
a member disposed above said inlet port having a shielding part and two inclining walls which have respective scratch-off edges, said two inclining walls opening into a V-shape toward a rear side in said predetermined rotation direction of each said blade, and
said shielding part having a V-shape including a rear tip end, said rear tip end of said shielding part protruding between said two inclining walls toward the rear side from a front central part of said two inclining walls, said rear tip end of said shielding part being disposed on an upper part of said rotor case, said rear tip end of said shielding part being spaced from a rear edge of said inlet port with a selected clearance therebetween, a concave portion having a depth through which plural granules can pass being disposed in a bottom surface of said shielding part, and a plurality of air-vent grooves extending in a bottom surface of said member below respective ones of said inclining walls, each of said plurality of air-vent grooves extending from a front side to a rear side of said member as viewed in the rotation direction of an adjacent one of said blades passing the front end of the scratch-off edges.

3. A catch-in prevention rotary valve as set forth in claim 2 or claim 1, in which each said air vent groove has a generally triangular shape and is spaced from a side edge of said inlet port and from an adjacent scratch-off edge by a specified distance, and wherein a front edge of each said air vent groove is substantially in parallel with a portion of the adjacent one of blades.

* * * * *